United States Patent
Jaliwala et al.

(10) Patent No.: US 6,837,227 B2
(45) Date of Patent: Jan. 4, 2005

(54) SYSTEM AND METHOD FOR ESTIMATING EGR MASS FLOW AND EGR FRACTION

(75) Inventors: Salim A. Jaliwala, Columbus, IN (US); Paul R. Miller, Columbus, IN (US); Larry J. Brackney, Columbus, IN (US); Thomas A. Dollmeyer, Columbus, IN (US); Chuan He, Columbus, IN (US); George Brunemann, Cincinnati, OH (US); John F. Wright, Columbus, IN (US); Stephen J. Charlton, Columbus, IN (US)

(73) Assignee: Cummins, Inc., Columbus, IN (US)

(*) Notice: Subject to any disclaimer, the term of this patent is extended or adjusted under 35 U.S.C. 154(b) by 0 days.

(21) Appl. No.: 09/774,897

(22) Filed: Jan. 31, 2001

(65) Prior Publication Data
US 2002/0100463 A1 Aug. 1, 2002

(51) Int. Cl.⁷ .............................................. F02B 47/08
(52) U.S. Cl. ................................. 123/568.21; 701/108
(58) Field of Search ...................... 123/569.11–568.28; 701/108

(56) References Cited

U.S. PATENT DOCUMENTS

| | | | |
|---|---|---|---|
| 4,186,699 A | * | 2/1980 | Aoyama .................. 123/568.2 |
| 4,598,684 A | | 7/1986 | Kato et al. |
| 4,601,277 A | * | 7/1986 | Cook ..................... 123/568.27 |
| 4,793,318 A | | 12/1988 | Tsurusaki |
| 4,870,942 A | | 10/1989 | Shibata et al. |
| 5,014,203 A | | 5/1991 | Miyazaki et al. |
| 5,086,745 A | | 2/1992 | Nishimura et al. |
| 5,140,535 A | | 8/1992 | Raff et al. |
| 5,190,017 A | | 3/1993 | Cullen et al. |
| 5,257,610 A | | 11/1993 | Ohuchi |
| 5,297,047 A | | 3/1994 | Matsuno |
| 5,301,126 A | | 4/1994 | Nishimura et al. |
| 5,341,300 A | | 8/1994 | Fujimoto |
| 5,508,926 A | | 4/1996 | Wade |
| 5,520,161 A | | 5/1996 | Klopp |
| 5,675,080 A | | 10/1997 | Wada |
| 5,703,777 A | | 12/1997 | Buchhop et al. |
| 5,918,582 A | | 7/1999 | Itoyama et al. |
| 5,934,249 A | | 8/1999 | Nanba et al. |
| 6,035,640 A | | 3/2000 | Kolmanovsky et al. |
| 6,076,353 A | | 6/2000 | Freudenberg et al. |
| 6,089,019 A | * | 7/2000 | Roby et al. ............. 60/605.2 |
| 6,125,830 A | | 10/2000 | Kotwicki et al. |

FOREIGN PATENT DOCUMENTS

| | | |
|---|---|---|
| EP | 0 907 013 A2 | 4/1999 |
| EP | 1 020 626 A2 | 7/2000 |
| EP | 1 024 272 A1 | 8/2000 |

* cited by examiner

Primary Examiner—Paul J. Hirsch
(74) Attorney, Agent, or Firm—Barnes & Thornburg (57) ABSTRACT

A system is disclosed for estimating the mass flow of recirculated exhaust gas (EGR) from an exhaust manifold to an intake manifold of an internal combustion engine via an EGR conduit disposed therebetween and a fraction of EGR attributable to a mass of charge flow entering the intake manifold. An engine controller is responsive to current values of various combinations of the engine exhaust temperature (ETE), intake manifold pressure (IMP), differential pressure (ΔP) across an EGR valve, and EGR valve position (EGRP) to determine an estimate of EGR mass flow. The controller is further operable to estimate EGR fraction as a function of the estimated EGR mass flow value, mass flow of charge entering the intake manifold, and engine speed.

34 Claims, 8 Drawing Sheets

SYSTEM AND METHOD FOR ESTIMATING EGR MASS FLOW AND EGR FRACTION

FIELD OF THE INVENTION

The present invention relates generally to techniques for determining EGR mass flow and EGR fraction in an exhaust gas recirculation system for an internal combustion engine, and more specifically to such techniques for estimating EGR mass flow and EGR fraction as functions of existing sensor information.

BACKGROUND OF THE INVENTION

When combustion occurs in an environment with excess oxygen, peak combustion temperatures increase which leads to the formation of unwanted emissions, such as oxides of nitrogen ($NO_x$). This problem is aggravated through the use of turbocharger machinery operable to increase the mass of fresh air flow, and hence increase the concentrations of oxygen and nitrogen present in the combustion chamber when temperatures are high during or after a combustion event.

One known technique for reducing unwanted emissions such as $NO_x$ involves introducing chemically inert gases into the fresh air flow stream for subsequent combustion. By thusly reducing the oxygen concentration of the resulting charge to be combusted, the fuel burns slower and peak combustion temperatures are accordingly reduced, thereby lowering the production of $NO_x$. In an internal combustion engine environment, such chemically inert gases are readily abundant in the form of exhaust gases, and one known method for achieving the foregoing result is through the use of a so-called Exhaust Gas Recirculation (EGR) system operable to controllably introduce (i.e., recirculate) exhaust gas from the exhaust manifold into the fresh air stream flowing to the intake manifold.

EGR operation is typically not required under all engine operating conditions, and known EGR systems accordingly include a valve, commonly referred to as an EGR valve, for controllably introducing exhaust gas to the intake manifold. Through the use of an on-board microprocessor, control of the EGR valve is typically accomplished as a function of information supplied by a number of engine operational sensors.

While EGR systems of the foregoing type are generally effective in reducing unwanted emissions resulting from the combustion process, a penalty is paid thereby in the form of a resulting loss in engine efficiency. A tradeoff thus exists in typical engine control strategies between the level of $NO_x$ production and engine operating efficiency, and difficulties associated with managing this tradeoff have been greatly exacerbated by the increasingly stringent requirements of government-mandated emission standards.

In order to achieve the dual, yet diametrically opposed, goals of limiting the production of $NO_x$ emissions to acceptably low levels while also maximizing engine operational efficiency under a variety of load conditions, substantial effort must be devoted to determining with a high degree of accuracy the correct proportions of air, fuel and exhaust gas making up the combustion charge. To this end, accurate, realtime values of a number of EGR system-related operating parameters must therefore be obtained, preferably at low cost. The present invention is directed to techniques for determining two of these parameters; namely EGR mass flow and EGR fraction.

SUMMARY OF THE INVENTION

The present invention is directed to techniques for determining EGR mass flow and EGR fraction. In accordance with one aspect of the present invention, a system for estimating EGR mass flow comprises a first pressure sensor producing a first pressure signal corresponding to a pressure within an intake manifold of an internal combustion engine, an exhaust gas recirculation (EGR) conduit fluidly coupling the intake manifold to an exhaust manifold of the engine, wherein the EGR conduit includes a flow restrictor disposed between the exhaust manifold and the intake manifold, means for determining a pressure differential across the flow restrictor, means for determining a temperature of exhaust gas produced by the engine and producing a temperature value corresponding thereto, means for determining an effective flow area of the flow restrictor, and a control circuit determining a mass flow of EGR through the EGR conduit based on the first pressure signal, the pressure differential, the temperature value and the effective flow area.

In accordance with another aspect of the present invention, a system for estimating EGR mass flow comprises an exhaust gas recirculation (EGR) conduit fluidly coupling an intake manifold of an internal combustion engine to an exhaust manifold thereof, wherein the EGR conduit includes an EGR valve disposed between the exhaust manifold and the intake manifold, an EGR valve position sensor producing a position signal indicative of EGR valve position relative to a reference position, means for determining a pressure differential between the exhaust and intake manifolds, and a control circuit determining EGR mass flow through the EGR conduit based on the position signal and the pressure differential.

In accordance with yet another aspect of the present invention, a system for estimating EGR mass flow comprises an exhaust gas recirculation (EGR) conduit fluidly coupling an intake manifold of an internal combustion engine to an exhaust manifold thereof, wherein the EGR conduit includes an EGR valve disposed between the exhaust manifold and the intake manifold, an EGR valve position sensor producing a position signal indicative of EGR valve position relative to a reference position, means for determining a pressure ratio between the exhaust and intake manifolds, means for determining a temperature of exhaust gas produced by the engine and producing a temperature value corresponding thereto, and a control circuit determining EGR mass flow through the EGR conduit based on the position signal, the pressure ratio and the temperature value.

One object of the present invention is to provide a system for estimating a mass flow rate of recirculated exhaust gas (EGR).

Another object of the present invention is to provide a system for estimating a fraction of charge flow attributable to recirculated exhaust gas (EGR fraction).

These and other objects of the present invention will become more apparent from the following description of the preferred embodiments.

DESCRIPTION OF THE PREFERRED EMBODIMENTS

For the purposes of promoting an understanding of the principles of the invention, reference will now be made to a number of embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

Figure 1:
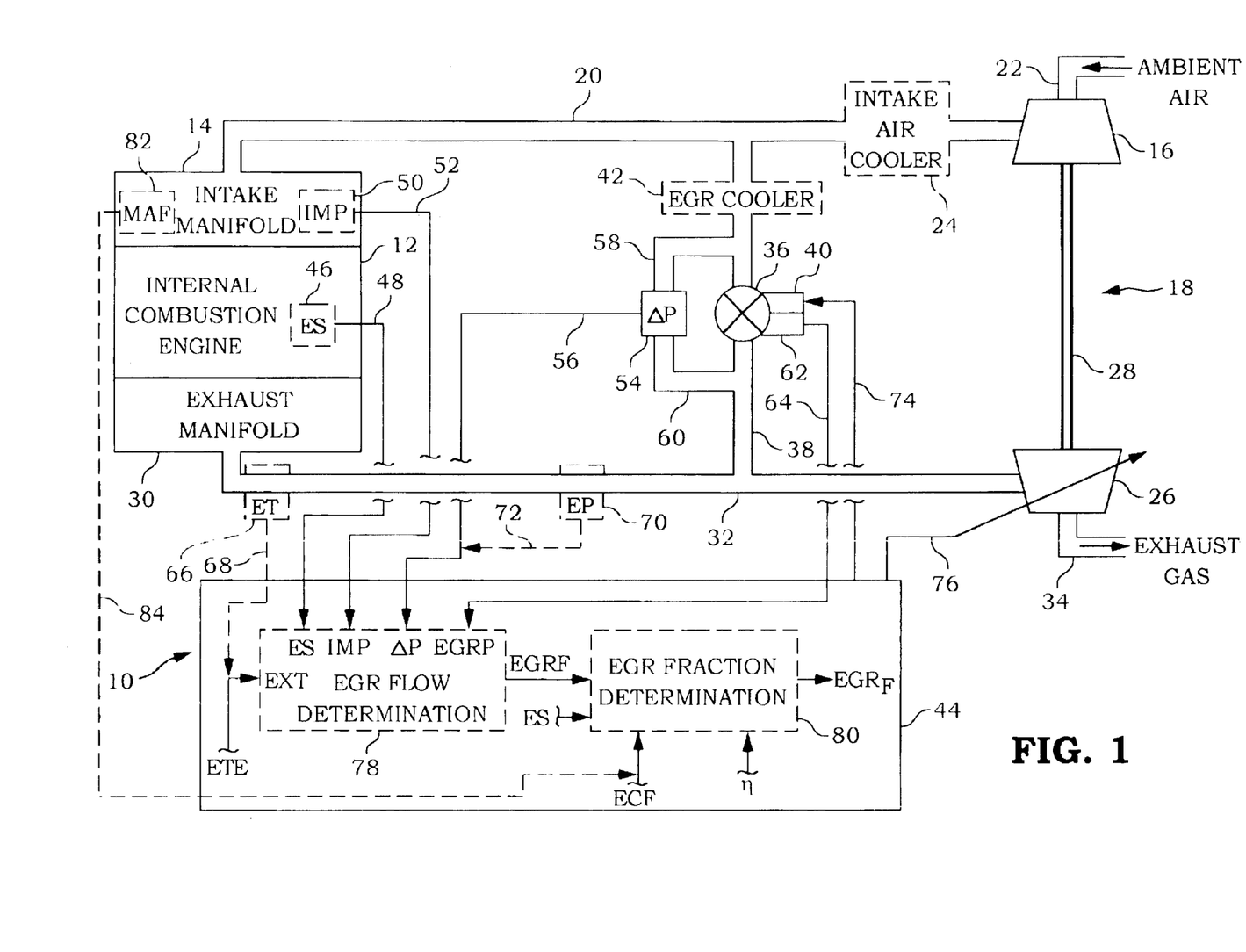
FIG. 1 is a diagrammatic illustration of one preferred embodiment of a system for estimating EGR mass flow and EGR fraction, in accordance with the present invention.

Referring now to FIG. 1, one preferred embodiment of a system 10 for estimating EGR mass flow and EGR fraction in an internal combustion engine, in accordance with the present invention, is shown. System 10 includes an internal combustion engine 12 having an intake manifold 14 fluidly coupled to a compressor 16 of a turbocharger 18 via intake conduit 20, wherein the compressor 16 receives fresh air via fresh air conduit 22. Optionally, as shown in phantom in FIG. 1, system 10 may include an intake air cooler 24 of known construction disposed in line with intake conduit 20 between the turbocharger compressor 16 and the intake manifold 14. The turbocharger compressor 16 is mechanically coupled to a turbocharger turbine 26 via drive shaft 28, wherein turbine 26 is fluidly coupled to an exhaust manifold 30 of engine 12 via exhaust conduit 32, and is further fluidly coupled to ambient via exhaust conduit 34. The exhaust conduit 32 is fluidly coupled to intake conduit 20 via an EGR conduit 38 having a flow restriction structure disposed in-line with conduit 38. In the embodiment illustrated in FIG. 1, the flow restriction structure is an EGR valve 36, although the present invention contemplates providing for alternative or additional flow restriction structures along EGR conduit 38. In any case, an EGR cooler 42 of known construction may optionally be disposed between EGR valve 36 and intake conduit 20 as shown in phantom in FIG. 1.

System 10 includes an engine controller 44 that is preferably microprocessor-based and is generally operable to control and manage the overall operation of engine 12. Engine controller 44 includes a memory unit (not shown) as well as a number of inputs and outputs for interfacing with various sensors and systems coupled to engine 12. Controller 44, in one embodiment, may be a known control unit sometimes referred to as an electronic or engine control module (ECM), electronic or engine control unit (ECU) or the like, or may alternatively be a general control circuit capable of operation as described hereinafter.

In accordance with one aspect of the present invention, engine controller 44 preferably includes an EGR flow determination block 78 receiving a number of input signals and producing an estimated EGR mass flow value (EGRF), and an EGR fraction determination block 80 responsive to the estimated EGR mass flow value EGRF as well as a number of additional input signals to produce an estimated EGR fraction value $EGR_F$. The EGR fraction value $EGR_F$ is generally understood in the art to be the fraction of total charge entering the intake manifold 14 that is attributable to recirculated exhaust gas. Engine controller 44 is preferably configured to control an EGR valve actuator 40 via signal path 74 and/or turbocharger swallowing capacity/efficiency via signal path 76 in accordance with one or more control strategies, some of which make use of the EGR mass flow value EGRF and/or EGR fraction value $EGR_F$. Examples of two related control strategies utilizing EGRF and/or $EGR_F$ are detailed in U.S. patent application Ser. No. 09/773,151, now U.S. Pat. No. 6,408,782 entitled SYSTEM FOR MANAGING CHARGE FLOW AND EGR FRACTION IN AN INTERNAL COMBUSTION ENGINE, and U.S. patent application Ser. No. 09/773,654, now U.S. Pat. No. 6,408,834 entitled SYSTEM FOR DECOUPLING EGR FLOW AND TURBOCHARGER SWALLOWING CAPACITY/EFFICIENCY CONTROL MECHANISMS, both of which are assigned to the assignee of the present invention, and the disclosures of which are each incorporated herein by reference.

System 10 includes a number of sensors and sensing systems for providing the engine controller 44 with information relating to the operation of engine 12. For example, the system 10 includes an engine speed sensor 46 operable to sense rotational speed of the engine 12 and produce an engine speed signal on signal path 48 indicative of engine rotational speed. In one embodiment, sensor 46 is a Hall effect sensor operable to determine engine speed by sensing passage thereby of a number of equi-angularly spaced teeth formed on a gear or tone wheel. Alternatively, engine speed sensor 46 may be any other known sensor operable as just described including, but not limited to, a variable reluctance sensor or the like. In any case, the engine speed signal provided on signal path 48 is supplied as an input to the EGR flow determination block 78 of engine controller 44. System 10 further includes an intake manifold pressure sensor 50 of known construction in fluid communication with the intake manifold 14 and producing a signal (IMP) on signal path 52 indicative of intake manifold pressure. The intake manifold pressure signal IMP is provided as another input to the EGR flow determination block 78 of engine controller 44.

System 10 further includes at least one sensor for determining a pressure differential across a flow restriction structure disposed in-line with EGR conduit 38. In the embodiment illustrated in FIG. 1, the flow restriction structure is an EGR valve 36, and one preferred structure for determining a pressure differential across EGR valve 36 includes a differential pressure sensor 54 of known construction producing a signal (ΔP) on signal path 56 indicative of the pressure differential between the exhaust conduit 32 and intake conduit 20 generally, and more specifically of the pressure differential across the EGR valve 36. The ΔP signal on signal path 56 is provided as another input to the EGR flow determination block 78 of engine controller 44. In this embodiment, a first conduit 58 preferably includes one end disposed in fluid communication with one end of the differential pressure sensor 54 and an opposite end in fluid communication with the EGR conduit 38 adjacent to one end of the EGR valve 36. A second conduit 60 preferably includes one end disposed in fluid communication with an opposite end of the differential pressure sensor 54 and an opposite end in fluid communication with the EGR conduit 38 adjacent to the opposite end of the EGR valve 36. As an alternative to the differential pressure sensor 54 and structural connections 58 and 60 to the EGR conduit 38, system 10 may optionally omit such components and instead include an exhaust pressure sensor 70 disposed in-line with exhaust conduit 32 as shown in phantom in FIG. 1, or alternatively disposed in fluid communication with the exhaust manifold 30. In either case, the exhaust pressure sensor 70 is operable to produce a signal indicative of exhaust pressure within the engine exhaust structure 30,32 on signal path 72, wherein the exhaust pressure signal is provided to the EGR flow determination block 78 in place of the differential pressure signal ΔP. In this embodiment, the engine controller 44 is operable to determine the differential pressure across the EGR valve 36 by subtracting the intake manifold pressure signal IMP from the exhaust pressure signal produced by the exhaust pressure sensor 70.

Figure 2A:
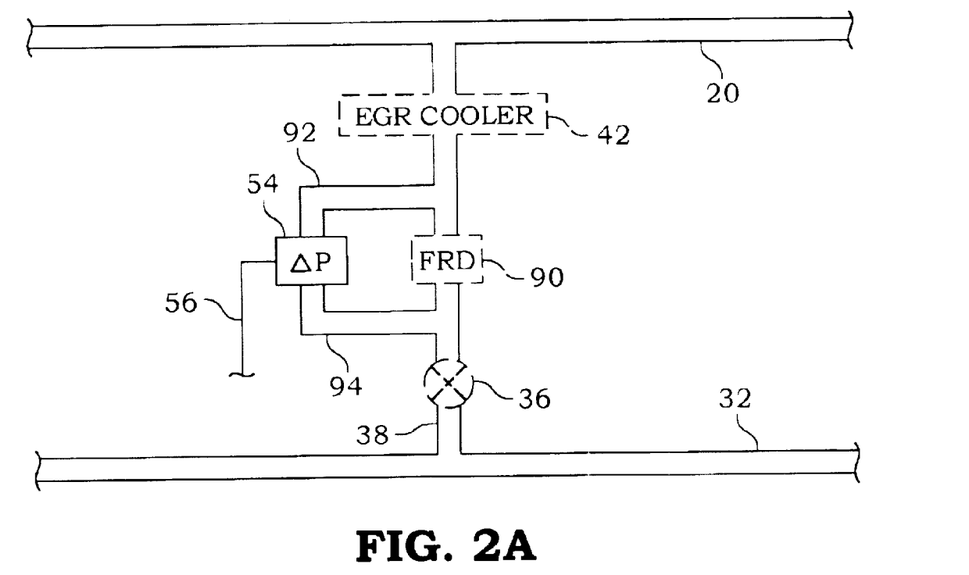
FIG. 2A is a diagrammatic illustration of an alternate embodiment of an arrangement for determining an EGR pressure differential between the engine exhaust and intake manifolds.

The present invention further contemplates other strategies for determining a differential pressure between the exhaust manifold 30 or conduit 32 and intake manifold 14 or conduit 20, and one such alternative strategy is illustrated in FIG. 2A. Referring to FIG. 2A, the EGR conduit 38 is shown disposed between the exhaust conduit 32 and intake conduit 20 with the optional EGR cooler 42 disposed in-line with EGR conduit 38 as illustrated in FIG. 1. The embodiment shown in FIG. 2A, may or may not include an EGR valve 36, and valve 36 is therefore shown in phantom in FIG. 2A. Instead of, or in addition to, the EGR valve 36, a fixed-geometry flow restriction device (FRD) 90 is disposed in-line with EGR conduit 38, and the differential pressure sensor 54 of FIG. 1 is connected in fluid communication with EGR conduit 38 on either side of the flow restriction device 90 via conduits 92 and 94. In this embodiment, a differential pressure sensor 54 may be used to determine the pressure differential across the fixed-geometry flow restriction device 92, or the differential pressure between exhaust conduit 32 and intake conduit 20 may be alternatively determined by subtracting the exhaust pressure signal from the intake manifold pressure signal if an exhaust pressure sensor 70 is included, in each case regardless of whether an EGR valve 36 is included.

Figure 2B:
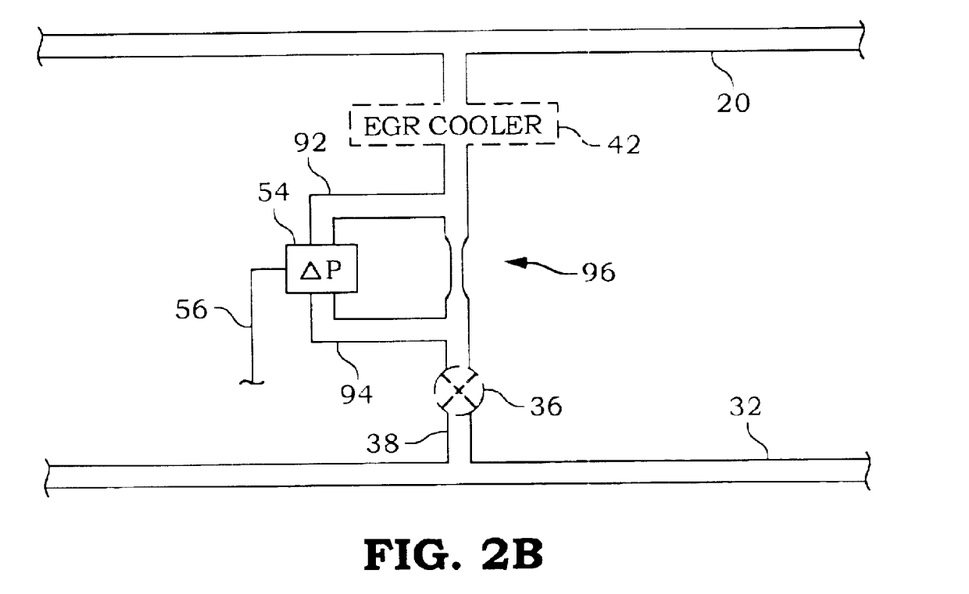
FIG. 2B is a diagrammatic illustration of another alternate embodiment of an arrangement for determining an EGR pressure differential between the engine exhaust and intake manifolds.

Referring to FIG. 2B, another alternative strategy for determining a differential pressure between the exhaust manifold 30 or conduit 32 and intake manifold 14 or conduit 20 is shown. The strategy of FIG. 2B is identical to that illustrated in FIG. 2A with the exception that the fixed-geometry flow restriction device 90 is replaced by a fixed-geometry flow restriction area 96 of EGR conduit 38. Operation of the system illustrated in FIG. 2B is otherwise identical to that discussed hereinabove with respect to FIG. 2A.

Referring back to FIG. 1, EGR valve 36 preferably includes an EGR position sensor of known construction and operable to produce on signal path 64 a signal (EGRP) indicative of EGR valve position, preferably relative to a reference valve position such as fully-open or fully closed. In one specific embodiment, for example, the reference valve position corresponds to a fully closed EGR valve and the EGR valve position signal is measure in millimeters of valve lift relative to the fully closed position. In any case, the EGR valve position signal EGRP is provided to another input of the EGR flow determination block 78 of engine controller 44.

The EGR flow determination block 78 includes an additional input for receiving a signal (ETE) indicative of engine exhaust temperature. In one embodiment, the engine exhaust temperature value (ETE) is provided by a model-based engine exhaust temperature estimation strategy such as that described in U.S. patent application Ser. No. 09/774,987, now U.S. Pat. No. 6,550,464 entitled SYSTEM FOR CONTROLLING ENGINE EXHAUST TEMPERATURE, which is assigned to the assignee of the present invention, and the disclosure of which are incorporated herein by reference. Alternatively, system 10 may include an exhaust temperature sensor 66 in fluid communication with either the exhaust conduit 32, as shown in phantom in FIG. 1, or in fluid communication with the exhaust manifold 30. In this case, the EGR flow determination block 78 is operable to receive the engine exhaust temperature value ETE from sensor 66 via signal path 68.

The EGR flow determination block 78 is operable, in accordance with the present invention, to produce an EGR mass flow value EGRF based on one or more of the input signals just described. Details relating to various embodiments of block 78 will be described hereinafter with respect to FIGS. 3–5. In any case, the EGR fraction determination block 80 preferably receives as inputs the EGR mass flow value EGRF produced by block 78 as well as the engine speed signal ES produced by engine speed sensor 46. Additionally, the EGR fraction determination block 80 is configured to include an input receiving a mass charge flow value (ECF), corresponding to the mass flow of charge entering the intake manifold 14, as well as an input receiving a volumetric efficiency value η corresponding to a volumetric efficiency of the intake manifold 14. In one embodiment, the charge flow value ECF and volumetric efficiency value η are both provided by a model-based charge flow estimation strategy, wherein an example of one such charge flow estimation strategy is shown in FIG. 9.

Figure 9:
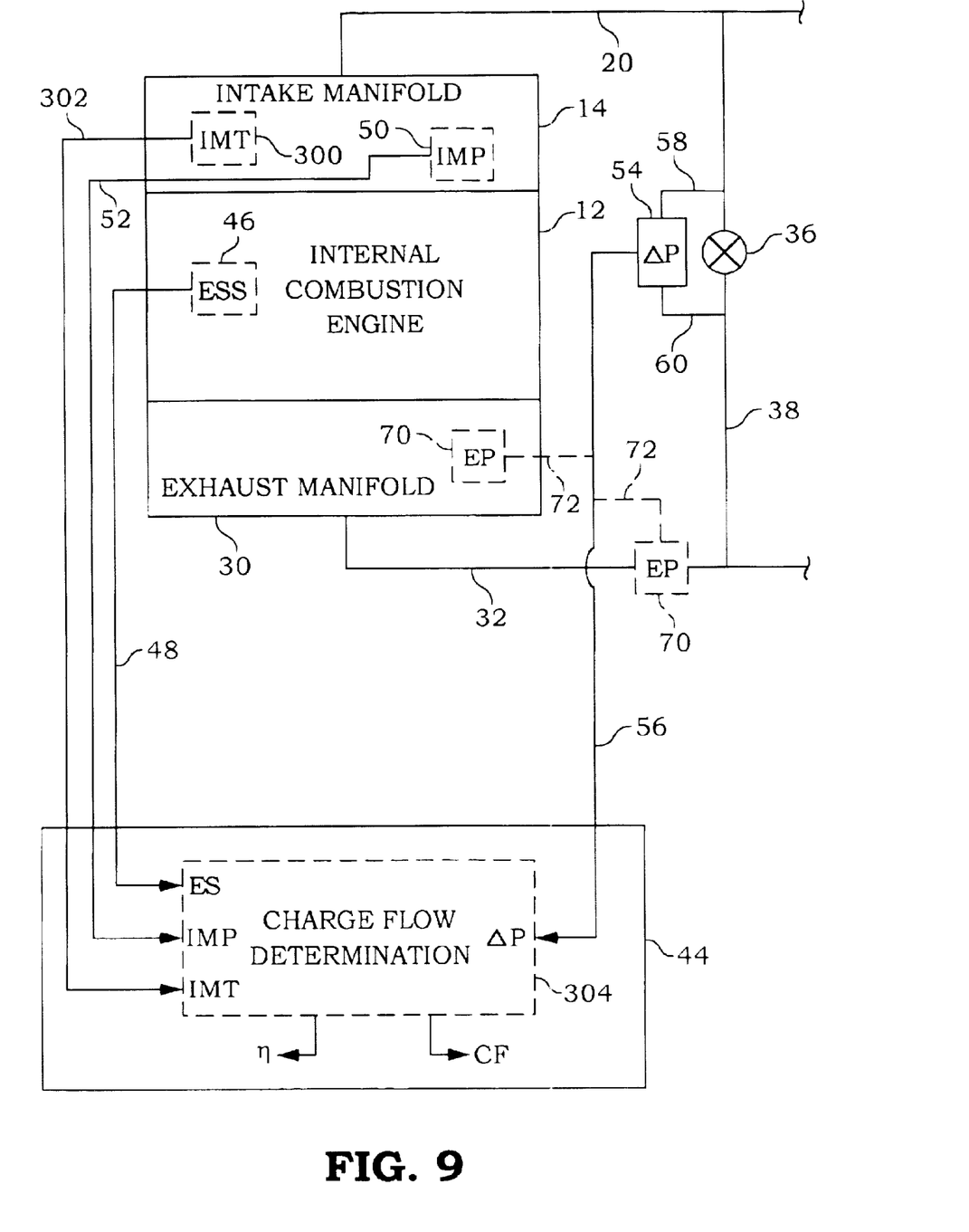
FIG. 9 is a diagrammatic illustration of one preferred embodiment of a technique for determining charge flow and volumetric efficiency parameters for use with the EGR fraction determination block of FIG. 6.

Referring to FIG. 9, a system 250 is shown for estimating charge flow; i.e., the mass flow of charge supplied to intake manifold 14, wherein the term "charge", as used herein, is defined as a composition of fresh air supplied by conduit 16 and exhaust gas supplied by exhaust conduit 30 preferably via EGR valve 36. In any case, system 250 includes several components in common with system 10 of FIG. 1, and like numbers are therefore used to identify like components. For example, system 250 includes an internal combustion engine 12 having an intake manifold 14 fluidly coupled to a compressor 16 of a turbocharger 18 (not shown) via intake conduit 20, wherein conduit 20 receives fresh air via the turbocharger compressor. An exhaust manifold 30 of engine 12 expels exhaust gas to ambient via exhaust conduits 32 and 34, and an EGR valve 36 is preferably disposed in fluid communications with the intake and exhaust conduits 20 and 32 respectively via EGR conduit 38. A ΔP sensor 54 is preferably positioned across the EGR valve 36 via conduits 58 and 60, and is electrically connected to an input of a charge flow determination block 304 of engine controller 54 via signal path 56. An intake manifold pressure sensor 50 is connected to another input of the charge flow determination block 304 via signal path 52, and an engine speed sensor 46 is electrically connected to another input of block 304 via signal path 48.

An intake manifold temperature sensor (IMT) 300 is disposed in fluid communication with the intake manifold 14 of engine 12, and is electrically connected to another input of the charge flow determination block 304 of engine controller 44 via signal path 302. IMT sensor 300 is preferably a known sensor operable to produce a signal on signal path 302 corresponding to the temperature of charge flowing into the intake manifold 14. Optionally, as shown and described with respect to FIG. 1, system 250 may include an exhaust pressure sensor EP 70 disposed in fluid communication with the exhaust manifold 30 or exhaust conduit 32, as shown in phantom in FIGS. 1 and 3, wherein either sensor 70 may be connected to the ΔP input of block 304.

In one preferred embodiment, the charge flow determination block 304 of the engine controller 44 is operable to compute an estimate of the mass flow of charge (ECF) into intake manifold 14 by first estimating the volumetric efficiency (η) of the charge intake system, and then computing ECF as a function of η using a well-known equation. Any known technique for estimating η may be used, and in one preferred embodiment of block 304 η is computed according to a known Taylor mach number-based volumetric efficiency equation given as:

$$\eta = A_1 * \{(Bore/D)^2 * (stroke*ES)^B / sqrt(\gamma*R*IMT) * [(1+EP/IMP)+A_2]\} + A_3 \quad (1),$$

where, $A_1, A_2, A_3$ and B are all calibratable parameters preferably fit to the volumetric efficiency equation based on mapped engine data, Bore is the intake valve bore length, D is the intake valve diameter, stroke is the piston stroke length, wherein Bore, D and stroke are generally dependent upon engine geometry, γ and R are known constants (γ*R=387.414 KJ/kg/deg K), ES is engine speed, IMP is the intake manifold pressure, EP is the exhaust pressure, where EP=IMP+ΔP, and IMT=intake manifold temperature.

From the foregoing equation, it should be apparent that system 250 may substitute an exhaust pressure sensor 70, as shown in phantom in FIG. 9, for the ΔP sensor 54, although commercially available exhaust pressure sensors that are capable of withstanding harsh environments associated with the exhaust manifold 30 and/or exhaust conduit 32 are not typically available. For purposes of the present invention, a ΔP sensor 54 is therefore preferably used.

With the volumetric efficiency value η estimated according to equation (1), the estimate charge flow value ECF is preferably computed according to the equation:

$$ECF = \eta * V_{DIS} * ES * IMP / (2*R*IMT) \quad (2),$$

where,

η is the estimated volumetric efficiency, $V_{DIS}$ is engine displacement and is generally dependent upon engine geometry, ES is engine speed, IMP is the intake manifold pressure, R is a known gas constant (R has an approximate value of 54 ft-lbf/lbm° R), and IMT is the intake manifold temperature.

Referring again to FIG. 1, those skilled in the art will recognize that a mass air flow sensor 82 of known construction may alternatively be disposed within the intake manifold 14, wherein information provided by such a mass air flow sensor on signal path 84 may be used to determine charge flow directly rather than using a charge flow virtual sensor as just described.

Figure 3:
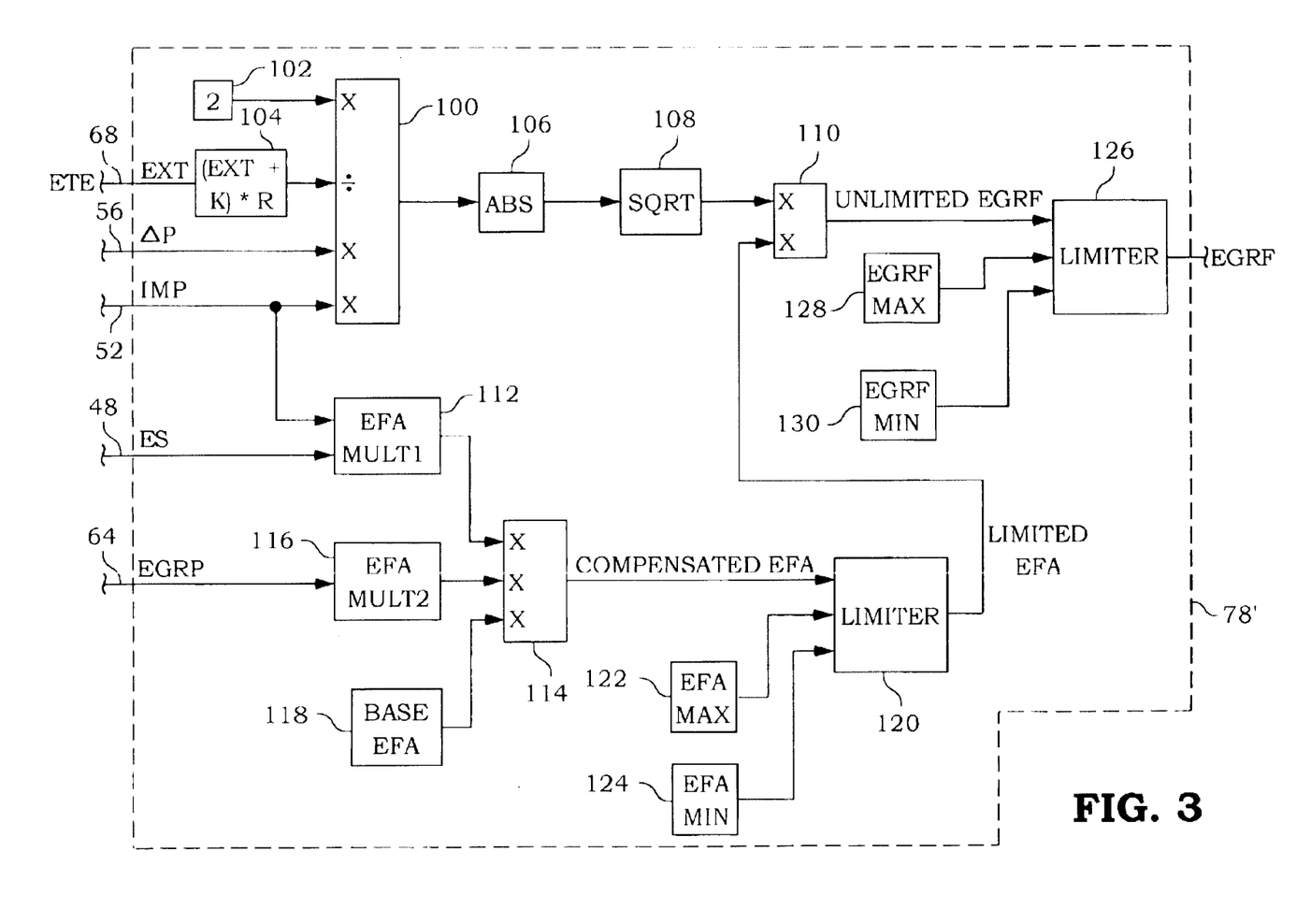
FIG. 3 is a diagrammatic illustration of one preferred embodiment of the EGR flow determination block of FIG. 1, in accordance with the present invention.

Referring now to FIG. 3, one preferred embodiment 78' of the EGR flow determination block 78 of FIG. 1, in accordance with the present invention, is shown. Block 78' includes a first arithmetic block 100 receiving a constant (e.g., 2) from a constant block 102 at a first multiplication input thereof. A second multiplication input of block 100 is configured to receive the intake manifold pressure signal IMP provided on signal path 52, and a third multiplication input is configured to receive the pressure differential signal ΔP signal provided on signal path 56. In one embodiment, a ΔP sensor 54 disposed across an EGR valve 36, as shown in FIG. 1, is preferably used to provide the ΔP signal. In one alternative embodiment, a ΔP sensor 54 disposed across any flow restriction device 90, as shown in FIG. 2A, is used to provide the ΔP signal. In another alternative embodiment, a ΔP sensor 54 disposed across a flow restriction area 96 of EGR conduit 40, as shown in FIG. 2B, is used to provide the ΔP signal. In still another alternative embodiment, the ΔP sensor 54 may be omitted from system 10, and a exhaust pressure sensor 70 may be substituted therefore, as shown in phantom in FIG. 1, wherein the pressure differential signal ΔP in this case is computed by the control circuit 44 as the exhaust pressure signal EXP minus the intake manifold pressure signal IMP. Those skilled in the art will recognize that the choice and location of the sensor or sensors used to compute ΔP for use by block 78' of FIG. 3 will generally dictate at least some of the remaining requirements of block 78', wherein such requirements will be more fully described hereinafter.

A division input of arithmetic block 100 receives a product of the exhaust temperature value ETE, converted to degrees R, and the gas constant R provided by block 104. In the embodiment shown in FIG. 3, the conversion block 104 is preferably operable to add a constant, K, to the ETE value, which is typically provided in units of degrees Fahrenheit, to convert the ETE value to units of degrees R. The converted ETE value is then multiplied by a known gas constant, R, having an approximate value of 54 ft-lbf/lbm° R. In one embodiment, the engine exhaust temperature value ETE is provided by an engine exhaust temperature estimation algorithm such as that described hereinabove with respect to FIG. 1. Alternatively, system 10 may include an engine exhaust temperature sensor 66 providing an engine exhaust temperature signal on signal path 68 as shown in phantom in FIGS. 1 and 3. In either case, the output of arithmetic block 100 is provided as an input to an absolute value block 106 supplying its absolute value output to a square root block 108. The output of block 108 thus produces an EGR flow parameter (EGRFP) according to the equation:

$$EGRFP = sqrt[|(2*\Delta P*IMP)/(R*ETE)|] \quad (3).$$

Those skilled in the art will recognize that the expression (IMP/(R*ETE)) in equation (3) corresponds to the density of gas flowing through a flow orifice (typically represented as "ρ"), wherein equation (3) assumes that the exhaust temperature (ETE) is constant through the flow orifice. It is to be understood, however, that the present invention contemplates using alternate expressions for the gas density parameter ρ wherein the exhaust temperature (ETE) is not assumed to be constant through the flow orifice, and that such alternate expressions are intended to fall within the scope of the present invention.

The intake manifold pressure signal IMP is further provided, along with the engine speed signal ES on signal path 48, to a first effective flow area (EFA) multiplier block 112 providing an output to a multiplication input of another arithmetic block 114. Multiplier block 112 may be provided in the form of a table, graph, one or more equations, or the like, and is preferably a function that takes into account effects on the effective flow area of the flow restriction structure of pulsations in intake manifold pressure due to engine valve movement and other factors related to the cyclic operation of engine 12. Preferably, the value produced by block 112 decreases as either IMP and/or ES increase. In some embodiments, block 78' may include a second EFA multiplier block 116 receiving the EGR valve position signal at an input thereof and providing an output signal to a second multiplication input of arithmetic block 114. Block 78' may further include a base EFA block 118 producing a base EFA value preferably corresponding to a maximum flow area of the flow restriction structure, wherein the base EFA value is provided to a third multiplication input of arithmetic block 114.

In embodiments of system 10 wherein the ΔP value supplied to arithmetic block 100 corresponds to a differential pressure across an EGR valve 36 (i.e., as illustrated in FIG. 1), the base EFA value of block 118 preferably corresponds to the cross-sectional flow area of valve 36 at maximum valve lift (e.g., fully open). In this embodiment, block 116 may be provided in the form of a table, graph or one or more equations, or the like and is preferably configured to take into account a reduction in the base effective flow area through the EGR valve 36 as a function of EGR valve position. In one preferred embodiment, for example, block 116 is preferably provided as a table populated with values between 0 and 1, wherein 1 corresponds to a fully open, or maximum lift of, valve 36 and 0 corresponds to a fully closed, or no-lift condition of, valve 36. In this embodiment, the compensated EFA value produced by block 114 is a product of the base EFA value, a value produced by the EFA multi block 116 based on EGR valve position (EGRP) and a value produced by the EFA multi block 112 based on intake manifold pressure (IMP) and engine speed (ES).

In embodiments of system 10 wherein the ΔP value supplied to arithmetic block 100 corresponds to a differential pressure across a fixed-geometry flow restriction device 90 (FIG. 2A) or fixed-geometry flow restriction area 96 (FIG. 2B), blocks 116 and 118 may be omitted or alternatively configured to each produce constant values of 1. In this embodiment, the EFA multiplication block 112 is preferably configured to provide a function of the form:

$$EFA = (\text{base } EFA + a + b/ES^{1.5} + c/IMP^2) \quad (4),$$

wherein base EFA is the cross-sectional flow area of the fixed-geometry flow restriction structure, and a, b and c are constants that are preferably determined by fitting performance data to the model of equation (4). In this embodiment, the compensated EFA value produced by block 114 is the EFA value produced by equation (4).

In any case, the compensated EFA value produced by arithmetic block 114 is provided to one input of a limiter block 120 having a first additional input receiving a maximum EFA value (EFA MAX) from block 122 and a second additional input receiving a minimum EFA value (EFA MIN) from block 124. The limiter block 120 is operable, as is known in the art, to limit the compensated EFA value to a minimum of EFA MIN and to a maximum of EFA MAX. The limited EFA value produced by block 120 is provided to a second multiplication input of arithmetic block 110.

The output of block 110 provides an unlimited EGR mass flow value that is supplied to one input of a limiter block 126 having a first additional input receiving a maximum EGR mass flow value (EGRF MAX) from block 128 and a second additional input receiving a minimum EGR mass flow value (EGR MIN) from block 130. The limiter block 126 is operable, as is known in the art, to limit the unlimited EGR mass flow value produced by block 110 to a maximum of EGRF MAX and a minimum of EGRF MIN. The output of limiter block 126 provides the EGR mass flow estimate value EGRF produced by block 78'.

It should be apparent from the foregoing that the EGR flow parameter produced at the output of block 108 of FIG. 3 represents a steady-state EGR flow value as a function of the pressure differential between the engine exhaust structure 30, 32 and the engine intake structure 14, 20, the intake manifold pressure (IMP) and the engine exhaust temperature (ETE). The output of the limiter block 120 clamps the compensated EFA value to a reasonable range defined by EFA MAX and EFA MIN.

Figure 4:
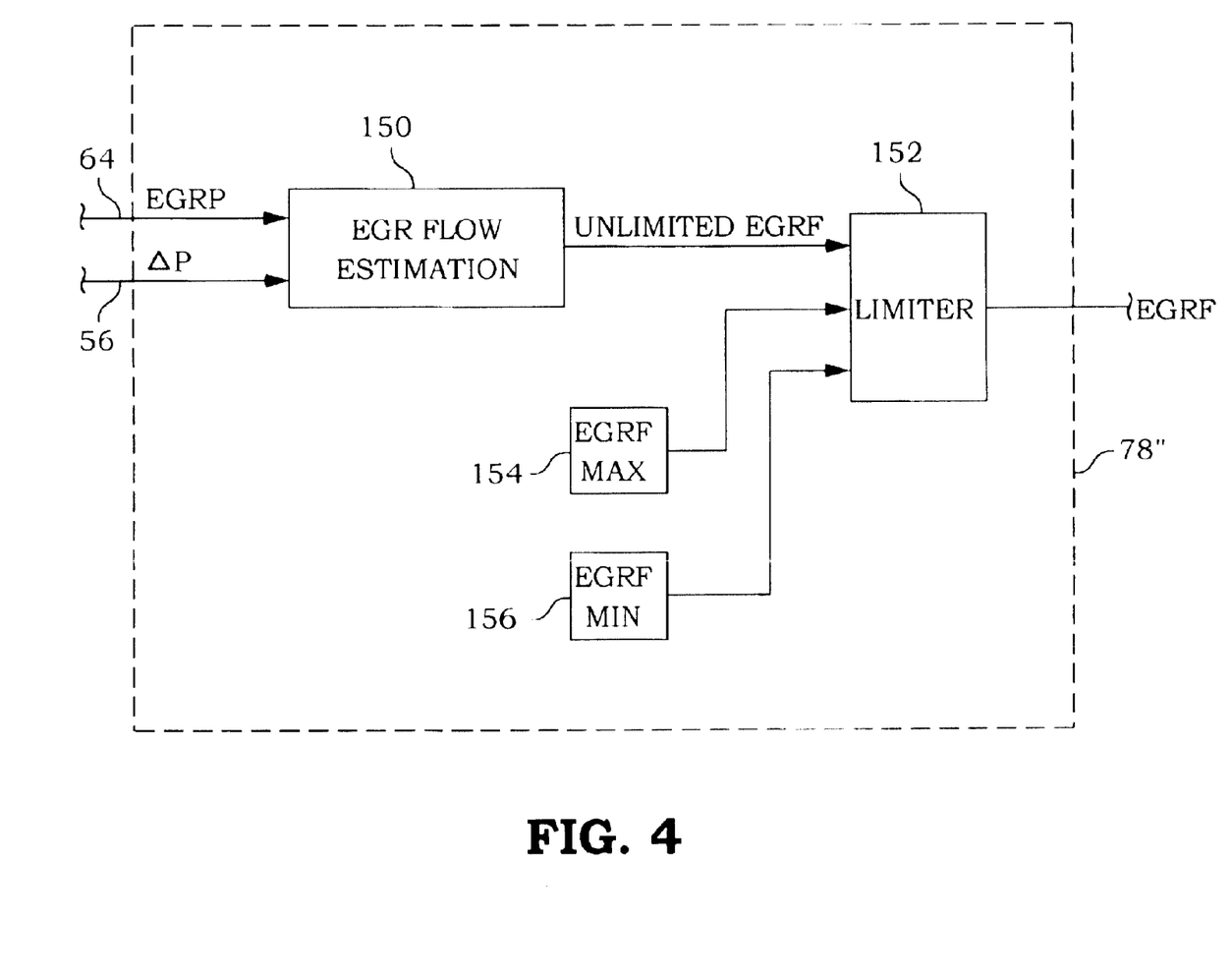
FIG. 4 is a diagrammatic illustration of an alternate embodiment of the EGR flow determination block of FIG. 1, in accordance with the present invention.

Referring now to FIG. 4, an alternate embodiment 78" of the EGR flow determination block 78 of FIG. 1, in accordance with the present invention, is shown. Block 78" includes an EGR flow estimation block 150 receiving as inputs the EGR valve position signal EGRP on signal path 64 and the pressure differential signal ΔP on signal path 56, and producing as an output an unlimited EGR mass flow value. The unlimited EGR mass flow value is provided as an input to a limiter block 152 having a first additional input receiving a maximum EGR mass flow value (EGRF MAX) from block 154 and a second additional input receiving a minimum EGR mass flow value (EGRF MIN) from block 156. The limiter block 152 is operable, as is known in the art, to limit the unlimited EGR mass flow value to a maximum value of EGRF MAX and to a minimum value of EGRF MIN. The output of block 152 provides the EGR mass flow value EGRF produced by block 78".

Figure 6:
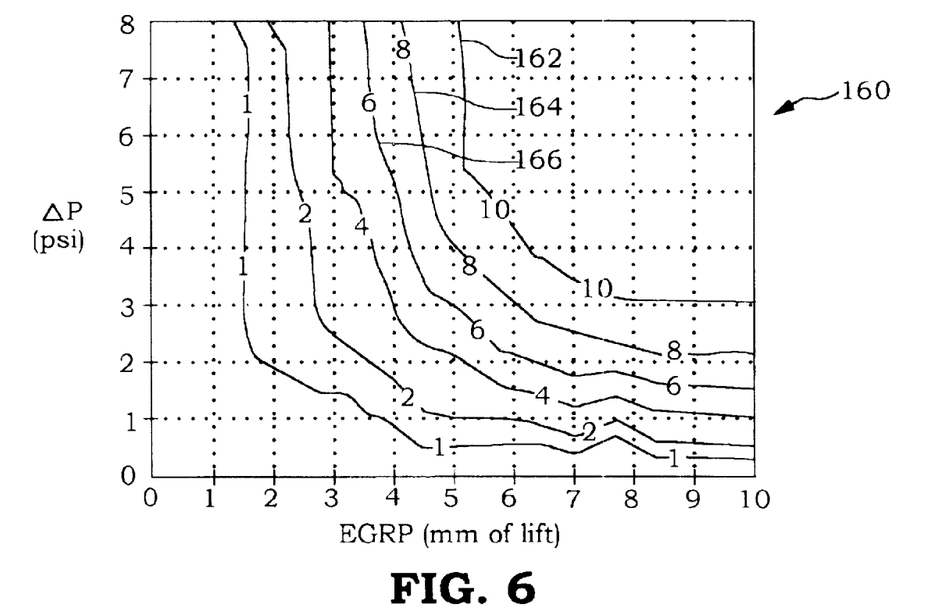
FIG. 6 is a plot of ΔP vs. EGR valve position illustrating one preferred embodiment of the EGR flow determination block of FIG. 4.

Referring to FIG. 6, one preferred embodiment of the EGR flow estimation block 150 of block 78" is shown, wherein the flow estimation function of block 150 is illustrated as a plot 160 of ΔP (psi) vs. EGR valve position EGRP (mm of valve lift). Plotted against 66 P and EGRP are a number of constant EGR mass flow contours 162, 164, 166, etc. Block 150 is operable to select an appropriate EGR flow contour based on current values of ΔP and EGRP, or use known interpolation techniques to produce more accurate EGR mass flow estimates. Alternatively, the plot 160 illustrated in FIG. 6 may be provided in the form of a look-up table, as one or more equations relating ΔP and EGRP to EGR mass flow, or the like. It will be noted that the embodiment 78" of block 78 illustrated in FIGS. 4 and 6 requires the EGR valve position signal EGRP, and is therefore suitable for use only with embodiments of system 10 wherein an EGR valve 36 is used as the flow restriction structure across which a differential pressure is determined as illustrated in FIG. 1. Alternatively, the differential pressure sensor 54 may be disposed across a fixed-geometry flow restriction device (FRD) such as FRD 90 or 96 illustrated in either of FIGS. 2A and 2B. In this case, the EGR valve position signal (EGRP) in embodiment 78" illustrated in FIG. 4 is replaced with an effective flow area value (EFA) corresponding to an effective flow area of the fixed-geometry flow restriction device (90 or 96). In this alternate embodiment, block 150 of FIG. 4 (one preferred embodiment of which is illustrated by plot 160 of FIG. 6) must be modified to reflect that EFA is a constant, and that the unlimited EGR flow value produced by block 150 is simply a variable function of ΔP.

Figure 5:
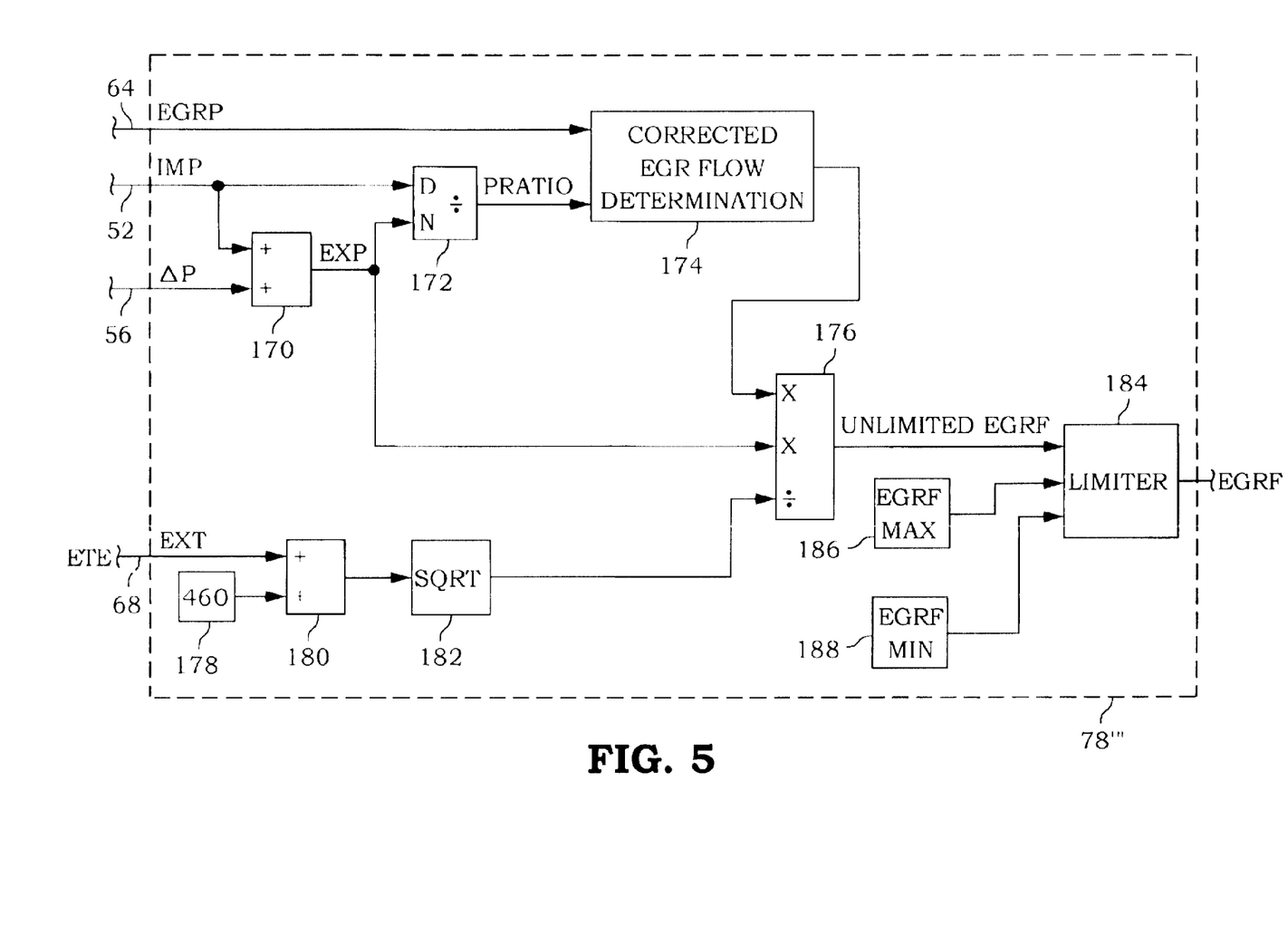
FIG. 5 is a diagrammatic illustration of another alternate embodiment of the EGR flow determination block of FIG. 1, in accordance with the present invention.

Referring now to FIG. 5, another alternate embodiment 78''' of the EGR flow determination block 78 of FIG. 1, in accordance with the present invention, is shown. Block 78''' preferably includes a summation block 170 having a first input receiving the intake manifold pressure signal IMP on signal path 52 and a second input receiving the differential pressure signal ΔP on signal path 56, and an output producing the sum of these two values which is equal to the pressure of engine exhaust EXP. Alternatively, the present invention contemplates that ΔP sensor 54 of FIG. 1 may be omitted from system 10 and an exhaust pressure sensor 70 used instead to produce the EXP signal. In either case, the EXP signal is provided to a numerator input of a division block 172 having a denominator input receiving the intake manifold pressure signal IMP. The output of the division block 172 is a ratio of engine exhaust pressure EXP to intake manifold pressure IMP, and is represented in FIG. 5 as a pressure ratio or PRATIO. The pressure ratio value PRATIO is provided to a first input of a corrected EGR flow determination block 174 having a second input receiving the EGR valve position signal EGRP on signal path 64. Block 174 is operable to produce an EGR flow parameter as a function of EGRP and PRATIO, wherein this output is provided as a multiplication input to an arithmetic block 176.

Figure 7:
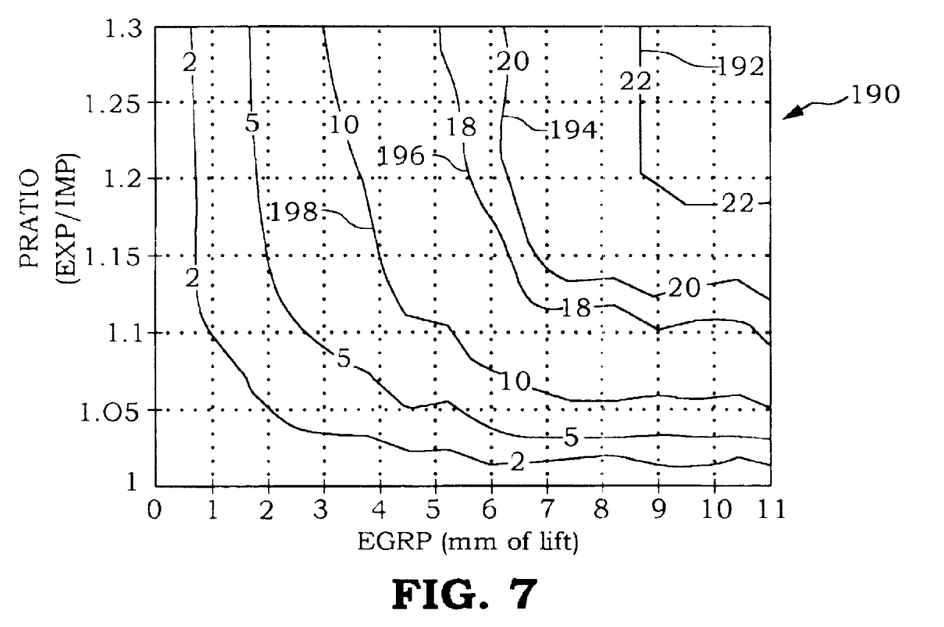
FIG. 7 is a plot of pressure ratio (exhaust pressure/intake manifold pressure) vs. EGR valve position illustrating one preferred embodiment of the corrected EGR flow determination block of FIG. 5.

Referring now to FIG. 7, one preferred embodiment of the corrected EGR flow determination block 174 of block 78''' is shown, wherein the flow estimation function of block 174 is illustrated as a plot 190 of PRATIO (EXP/IMP) vs. EGR valve position EGRP (mm of valve lift). Plotted against PRATIO and EGRP are a number of constant EGR mass flow contours 192, 194, 196, 198, etc. Block 174 is operable to select an appropriate EGR flow contour based on current values of PRATIO and EGRP, or use known interpolation techniques to produce more accurate EGR mass flow parameter estimates. Alternatively, the plot 190 illustrated in FIG. 7 may be provided in the form of a look-up table, as one or more equations relating PRATIO and EGRP to appropriate EGR mass flow parameters, or the like. As with the embodiment 78'' of FIGS. 4 and 6, it will be noted that the embodiment 78''' of block 78 illustrated in FIGS. 5 and 7 requires the EGR valve position signal EGRP, and is therefore suitable for use only with embodiments of system 10 wherein an EGR valve 36 is used as the flow restriction structure across which a differential pressure is determined. Alternatively, the differential pressure sensor 54 may be disposed across a fixed-geometry flow restriction device (FRD) such as FRD 90 or 96 illustrated in either of FIGS. 2A and 2B. In this case, the EGR valve position signal (EGRP) in embodiment 78''' illustrated in FIG. 5 is replaced with an effective flow area value (EFA) corresponding to an effective flow area of the fixed-geometry flow restriction device (90 or 96). In this alternate embodiment, block 174 of FIG. 5 (one preferred embodiment of which is illustrated by plot 190 of FIG. 7) must modified to reflect that EFA is a constant, and that the corrected EGR flow value produced by block 174 is simply a variable function of PRATIO.

Referring again to FIG. 5, the arithmetic block 176 includes a second multiplication input receiving the engine exhaust pressure signal EXP, and a third division input receiving a value corresponding to the square root of the engine exhaust temperature value ETE. The engine exhaust temperature value, either determined in accordance with an engine exhaust temperature estimation model such as that described hereinabove with respect to FIG. 1, or received from an exhaust temperature sensor 66 via signal path 68 as shown in phantom in FIGS. 1 and 5, is provided as a first input to a summation block 180. A second input of block 180 receives a conversion constant (e.g., 460) from block 178 wherein the output of block 180 provides an engine exhaust value to a square root block 182. The engine exhaust temperature signal ETE is typically provided in units of degrees F, and the conversion provided by blocks 178 and 180 converts ETE to units of degrees R. In any case, the output of block 182 provides the square root of ETE to the division input of arithmetic block 176 such that an unlimited EGR mass flow value produced at the output of block 176 follows the equation:

$$\text{Unlimited } EGRF = EXP * f(EGRP, \text{PRATIO})/\text{sqrt}(ETE) \quad (5).$$

The unlimited EGR mass flow value is provided as an input to a limiter block 184 having a first additional input receiving a maximum EGR mass flow value (EGRF MAX) from block 186 and a second additional input receiving a minimum EGR mass flow value (EGRF MIN) from block 188. The limiter block 184 is operable, as is known in the art, to limit the unlimited EGR mass flow value to a maximum value of EGRF MAX and to a minimum value of EGRF MIN. The output of block 184 provides the EGR mass flow value EGRF produced by block 78'''.

Figure 8:
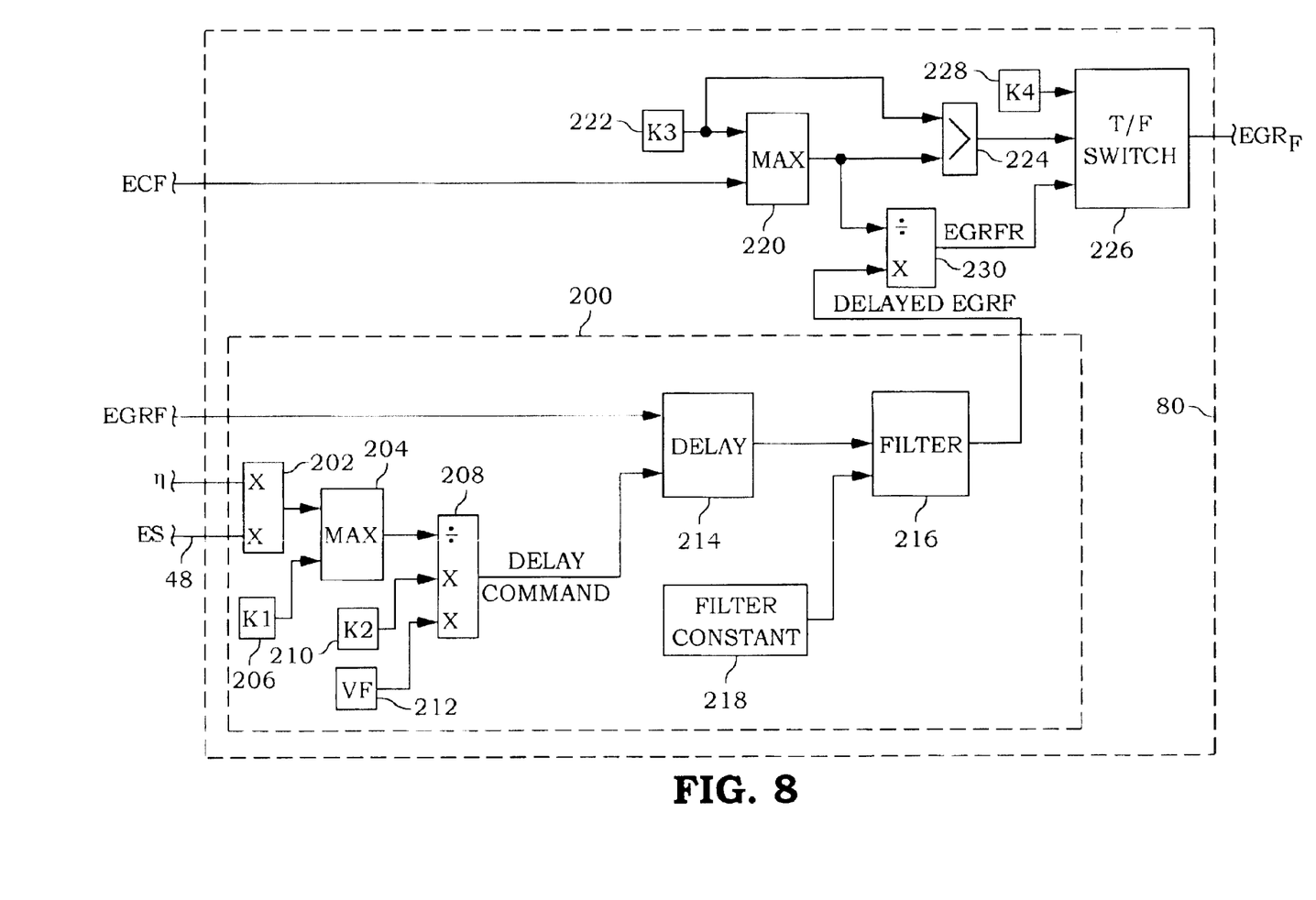
FIG. 8 is a diagrammatic illustration of one preferred embodiment of the EGR fraction determination block of FIG. 1, in accordance with the present invention.

Referring now to FIG. 8, one preferred embodiment of the EGR fraction determination block 80 of FIG. 1, in accordance with the present invention, is shown. Block 80 of FIG. 8 includes a first block 200 producing a delayed EGR mass flow value (DELAYED EGRF) based on the EGRF value provided by the EGR flow determination block 78 of FIG. 1, a volumetric efficiency value η associated with the volumetric efficiency of the intake manifold 14 and a current value of engine speed ES. Block 200 assumes as delay or transport lag in the supply of recirculated exhaust gas from the EGR valve 36 to the intake manifold 14, wherein this time delay is based on the time to move one displacement volume of fluid through the engine at a given volumetric efficiency. The remainder of block 80 is configured to compute EGR fraction ($EGR_F$) as a function of the delayed EGR mass flow value and the charge mass flow value ECF provided either by a charge flow estimation model such as that described hereinabove with respect to FIG. 9, or by an optional mass air flow sensor 82 as shown in phantom in FIG. 1. In either case, the resulting EGR fraction value EGRF may be used by any of a number of EGR and/or turbocharger control strategies requiring such information.

Beginning with block 200, an arithmetic block 202 includes a first multiplication input receiving a current volumetric efficiency value η that is preferably provided by a charge flow estimation model such as that described hereinabove with respect to FIG. 9. A second multiplication input of block 202 receives the engine speed signal ES on signal path 48, and an output of block 202 provides the product of η and ES to one input of a MAX block 204. A constant K1 is supplied by block 206 to a second input of block 204, wherein K1 is greater than zero but preferably less than normal values for the product of η and ES (e.g., 200) to avoid dividing by zero in block 208. The output of block 204 is provided to a division input of another arithmetic block 208 having a first multiplication input receiving a first constant K2 from block 210 and a second multiplication input receiving a volume fraction constant VF from block 212. Constant K2 is preferably a conversion factor for converting the engine speed portion of the value produced at the output of block 204 to appropriate units, and in one embodiment K2=120 rev*sec/cycle*min. The volume fraction constant VF is preferably inversely proportional to the engine displacement-to-EGR line volume ratio, which is a known quantity dependent upon the geometry of engine 12 and certain EGR components.

The result of the product of VF and K2 divided by the maximum value of K1 and the product of η and ES is a delay command provided to one input of a delay block 214 having a second input receiving the EGR mass flow signal EGRF from the EGR flow determination block 78 of FIG. 1. The delay block 214 is operable to delay the EGR mass flow value for a time period based on the value of the delay command as is known in the art, and the output of the delay block 214 is provided to a filter block 216 having a filter constant 218 associated therewith. In one embodiment, the filter block 216 is a first-order filter, although the present invention contemplates other known filters for use as filter block 216.

In any case, the output of filter block 216 provides the delayed EGR mass flow value (DELAYED EGRF) to a multiplication input of an arithmetic block 230. A division input to block 230 is provided by the output of a MAX block 220 supplying the maximum value of the charge flow value ECF and a predefined constant K3 provided by block 222. The constant K3 is also supplied to a first input of a comparison block (>) 224 having a second input receiving the output of the MAX block 220. The outputs of the comparison block 224 and arithmetic block 230 are each supplied to separate inputs of a true/false switch 226 having a third input receiving a constant K4 from block 228. The output of the true/false switch 226 provides the EGR fraction value $EGR_F$. Blocks 220–230 are configured such that the EGR fraction $EGR_F$ is equal to a ratio of the delayed EGR mass flow value (DELAYED EGRF) and the charge flow value ECF as long as the charge flow value is greater than K3. If, on the other hand, the charge flow value ECF is less than or equal to K3, the EGR fraction value EGRF is set to the value K4. In one embodiment, K3=0.5 and K4=0, although the present invention contemplates other values for K3 and K4.

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected.

What is claimed is:

1. A system for estimating EGR mass flow, comprising:
   an exhaust gas recirculation (EGR) conduit fluidly coupling an intake manifold of an internal combustion engine to an exhaust manifold of said engine, said EGR conduit including a flow restrictor disposed between said exhaust manifold and said intake manifold;
   means for determining a pressure differential across said flow restrictor;
   means for determining a gas density value corresponding to a density of gas flowing through said flow restrictor;
   means for determining an effective flow area of said flow restrictor; and
   a control circuit determining a mass flow of EGR through said EGR conduit based on said pressure differential, said gas density value and said effective flow area.

2. The system of claim 1 wherein said flow restrictor comprises a flow restriction device disposed in line with said EGR conduit, said flow restriction device responsive to a flow control signal to correspondingly restrict EGR flow therethrough.

3. The system of claim 2 wherein said flow restriction device is an EGR valve.

4. The system of claim 3 wherein said EGR valve includes an EGR valve position sensor producing a position signal corresponding to a position of said EGR valve relative to a reference position;
   and wherein said means for determining an effective flow area of said flow restrictor includes means for determining an effective flow area of said EGR valve based on said position signal.

5. The system of claim 4 further including:
   an engine speed sensor producing an engine speed signal corresponding to rotational speed of said engine; and
   a pressure sensor producing a pressure signal corresponding to a pressure within said intake manifold;
   and wherein said means for determining an effective flow area of said EGR valve includes means for determining said effective flow area of said EGR valve based further on said engine speed signal and said pressure signal.

6. The system of claim 2 further including:
   an engine speed sensor producing an engine speed signal corresponding to rotational speed of said engine; and
   a pressure sensor producing a pressure signal corresponding to a pressure within said intake manifold;
   wherein said means for determining an effective flow area of said flow restrictor further includes a base effective flow area value associated therewith, said means for determining an effective flow area of said flow restrictor determining said effective flow area as a product of said base effective flow area and a multiplier based on said pressure signal and said engine speed signal.

7. The system of claim 2 wherein said means for determining a pressure differential across said flow restrictor includes a differential pressure sensor disposed across said flow restriction device, said differential pressure sensor producing a differential pressure signal indicative of a pressure differential across said flow restriction device.

8. The system of claim 7 further including:
   a first conduit having a first end in fluid communication with said EGR conduit adjacent to one end of said flow restriction device and a second end in fluid communication with one end of said differential pressure sensor; and
   a second conduit having a first end in fluid communication with said EGR conduit adjacent to an opposite end of said flow restriction device and a second end in fluid communication with an opposite end of said differential pressure sensor.

9. The system of claim 8 wherein said flow restriction device is an EGR valve.

10. The system of claim 2 wherein said means for determining a pressure differential across said flow restrictor includes:
    a first pressure sensor producing a first pressure signal corresponding to a pressure within said intake manifold;
    a second pressure sensor producing a second pressure signal corresponding to a pressure of exhaust gas within an exhaust gas flow structure of said engine; and
    means for determining said pressure differential as a function of said first and second pressure signals.

11. The system of claim 1 wherein said flow restrictor comprises a flow restriction area of said EGR conduit sized to restrict EGR flow therethrough.

12. The system of claim 11 wherein said means for determining a pressure differential across said flow restrictor includes a differential pressure sensor disposed across said flow restriction area of said EGR conduit, said differential pressure sensor producing a differential pressure signal indicative of a pressure differential across said flow restriction area of said EGR conduit.

13. The system of claim 12 further including:

a first conduit having a first end in fluid communication with said EGR conduit adjacent to one end of said flow restriction area thereof and a second end in fluid communication with one end of said differential pressure sensor; and a second conduit having a first end in fluid communication with said EGR conduit adjacent to an opposite end of said flow restriction area thereof and a second end in fluid communication with an opposite end of said differential pressure sensor.

14. The system of claim 1 wherein said means for determining a pressure differential across said flow restriction area of said EGR conduit includes:

a first pressure sensor producing a first pressure signal corresponding to a pressure within said intake manifold;

a second pressure sensor producing a second pressure signal corresponding to a pressure of exhaust gas within an exhaust gas flow structure of said engine; and means for determining said pressure differential as a function of said first and second pressure signals.

15. The system of claim 11 further including:

an engine speed sensor producing an engine speed signal corresponding to rotational speed of said engine; and a pressure sensor producing a pressure signal corresponding to a pressure within said intake manifold;

and wherein said means for determining an effective flow area of said flow restrictor includes means for determining an effective flow area of said flow restriction area of said EGR conduit based on said engine speed signal and on said pressure signal.

16. The system of claim 15 wherein said means for determining an effective flow area of said flow restriction area of said EGR conduit further includes a base effective flow area value associated therewith, said means for determining an effective flow area of said flow restriction area of said EGR conduit determining said effective flow area of said flow restriction area of said EGR conduit as a product of a multiplier based on said pressure signal and said engine speed signal and said base effective flow area value.

17. The system of claim 1 wherein said control circuit is configured to produce an EGR flow parameter (EGRFP) according to:

$EGRFP = sqrt[|(2*\Delta P*\rho)|]$;

wherein $\Delta P$ is said pressure differential and $\rho$ is said gas density value.

18. The system of claim 17 further including:

a pressure sensor producing a pressure signal corresponding to a pressure within said intake manifold; and means for determining a temperature of exhaust gas produced by said engine and producing a temperature value corresponding thereto;

wherein said control circuit is configured to compute said gas density value $\rho$ according to $\rho = (IMP)/(R*EXT)$ wherein, IMP is said pressure signal, EXT is said temperature value, and R is a gas constant.

19. The system of claim 17 wherein said control circuit is configured to compute said mass flow of EGR as a product of said EGR flow parameter and said effective flow area.

20. The system of claim 1 further including a limiter operable to limit said mass flow of EGR between maximum and minimum EGR mass flow values.

21. The system of claim 1 further including:

means for determining a mass flow of charge entering said intake manifold; and means for determining a fraction of said charge attributable to EGR as a function of said mass flow of EGR through said EGR conduit and said mass flow of charge entering said intake manifold.

22. The system of claim 21 further including:

means for determining a volumetric efficiency of said intake manifold; and means for determining a delayed EGR flow value as a function of said engine speed and said volumetric efficiency;

and wherein said means for determining said fraction of charge attributable to EGR is operable to determine said fraction as a function of said mass flow of charge entering said intake manifold and said delayed EGR flow value.

23. A system for estimating EGR mass flow, comprising:

an exhaust gas recirculation (EGR) conduit fluidly coupling an intake manifold of an internal combustion engine to an exhaust manifold thereof, said EGR conduit including an EGR valve disposed between said exhaust manifold and said intake manifold;

an EGR valve position sensor producing a position signal indicative of EGR valve position relative to a reference position;

means for determining a pressure differential between said exhaust and intake manifolds; and a control circuit determining EGR mass flow through said EGR conduit based on said position signal and said pressure differential.

24. The system of claim 23 wherein said control circuit includes a limiter operable to limit said EGR mass flow between maximum and minimum EGR mass flow values.

25. The system of claim 23 further including:

means for determining a mass flow of charge entering said intake manifold; and means for determining a fraction of said charge attributable to EGR as a function of said mass flow of EGR through said EGR conduit and said mass flow of charge entering said intake manifold.

26. The system of claim 25 further including:

means for determining a volumetric efficiency of said intake manifold; and means for determining a delayed EGR flow value as a function of said engine speed and said volumetric efficiency;

and wherein said means for determining said fraction of charge attributable to EGR is operable to determine said fraction as a function of said mass flow of charge entering said intake manifold and said delayed EGR flow value.

27. A system for estimating EGR mass flow, comprising:

an exhaust gas recirculation (EGR) conduit fluidly coupling an intake manifold of an internal combustion engine to an exhaust manifold thereof, said EGR conduit including an EGR valve disposed between said exhaust manifold and said intake manifold;

an EGR valve position sensor producing a position signal indicative of EGR valve position relative to a reference position;

means for determining a pressure ratio between said exhaust and intake manifolds;

means for determining a temperature of exhaust gas produced by said engine and producing a temperature value corresponding thereto; and a control circuit determining EGR mass flow through said EGR conduit based on said position signal, said pressure ratio and said temperature value.

28. The system of claim 27 wherein said means for determining a pressure ratio between said exhaust and intake manifolds includes:

a pressure sensor producing a pressure signal corresponding to a pressure within said intake manifold; and means for determining a pressure differential between said exhaust and intake manifolds; and means for computing said pressure ratio as a function of said pressure signal and said pressure differential.

29. The system of claim 28 wherein said means for determining a pressure differential between said exhaust and intake manifolds includes a differential pressure sensor having a first end in fluid communication with said EGR conduit adjacent to one end of said EGR valve and a second end in fluid communication with said EGR conduit adjacent to an opposite end of said EGR valve.

30. The system of claim 27 wherein said means for determining a pressure ratio between said exhaust and intake manifolds includes:

a first pressure sensor producing a first pressure signal corresponding to a pressure within said intake manifold;

a second pressure sensor producing a second pressure signal corresponding to a pressure within an engine exhaust structure; and means for computing said pressure ratio as a ratio of said first and second pressure signals.

31. The system of claim 27 wherein said control circuit includes:

means for producing a corrected EGR flow parameter value as a function of said position signal and said pressure ratio;

means for determining a pressure within an engine exhaust structure of said engine and producing an exhaust pressure value corresponding thereto;

means for producing a square root of said temperature value; and means for determining said EGR mass flow as a product of said corrected EGR flow parameter and said exhaust pressure value divided by said square root of said temperature value.

32. The system of claim 31 wherein said control circuit includes a limiter operable to limit said EGR mass flow between maximum and minimum EGR mass flow values.

33. The system of claim 27 further including:

means for determining a mass flow of charge entering said intake manifold; and means for determining a fraction of said charge attributable to EGR as a function of said mass flow of EGR through said EGR conduit and said mass flow of charge entering said intake manifold.

34. The system of claim 33 further including:

means for determining a volumetric efficiency of said intake manifold; and means for determining a delayed EGR flow value as a function of said engine speed and said volumetric efficiency;

and wherein said means for determining said fraction of charge attributable to EGR is operable to determine said fraction as a function of said mass flow of charge entering said intake manifold and said delayed EGR flow value.

* * * * *

UNITED STATES PATENT AND TRADEMARK OFFICE
CERTIFICATE OF CORRECTION

PATENT NO. : 6,837,227 B2
DATED : January 4, 2005
INVENTOR(S) : Jaliwala et al.

It is certified that error appears in the above-identified patent and that said Letters Patent is hereby corrected as shown below:

<u>Column 1,</u>
Line 59, "… realtime …" should read -- … real-time… --

<u>Column 10,</u>
Line 41, "… 66 P and EGRP …" should read -- … ΔP and EGRP… --

<u>Column 12,</u>
Line 44, "… EGRF may be …" should read -- … EGRF may be … --

<u>Column 13,</u>
Line 34, "… EGRF is set … " should read -- … EGRF is set … --

Signed and Sealed this

Twelfth Day of July, 2005

JON W. DUDAS
*Director of the United States Patent and Trademark Office*